Figure 1:
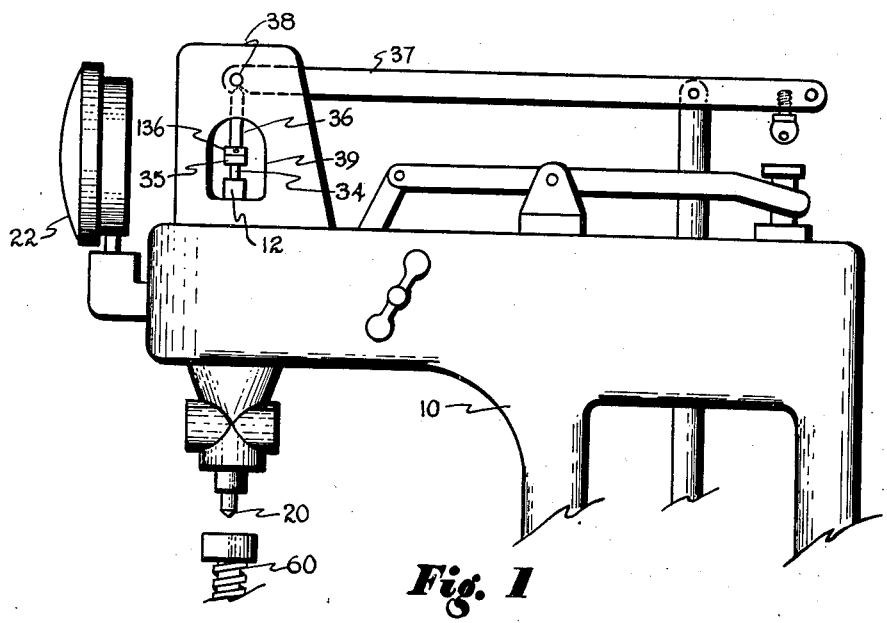

Aug. 17, 1943.  C. W. CLARK  2,326,759

HARDNESS TESTER ADJUSTMENT MEANS

Filed Oct. 28, 1941

INVENTOR.
Clyde W. Clark
BY Daniel G. Cullen.
ATTY.

Patented Aug. 17, 1943

2,326,759

UNITED STATES PATENT OFFICE 2,326,759

HARDNESS TESTER ADJUSTMENT MEANS

Clyde W. Clark, Dearborn, Mich.

Application October 28, 1941, Serial No. 416,891

6 Claims. (Cl. 265—12)

This application relates to hardness tester machines and discloses an improved form of major load device and adjustment means for the minor load gap.

In my prior application, Serial No. 384,083, filed March 19, 1941, there is disclosed a major load device comprising link 36, link pad 35, and link shank 34, and wherein pad 35 thereof engages the upper end of a spindle 12, with a nut 33 serving as a guide between the spindle and the load device, and adjustable for varying the effective distance between the top of the spindle and the spindle engaging pad of the load device, thus determining the minor load gap between the spindle and the load device.

This application discloses an improvement wherein the link and link shank are integral, rather than separate, and wherein the pad is adjustably mounted on the link, the pad thus forming the adjustment nut for varying the minor load gap, the nut being separate from the load device guiding formation of the spindle, rather than integral therewith.

An understanding of such improvement may be obtained from the appended drawing; in this drawing, Fig. 1 is a fragmentary view of a testing machine.

Figures 2, 3:
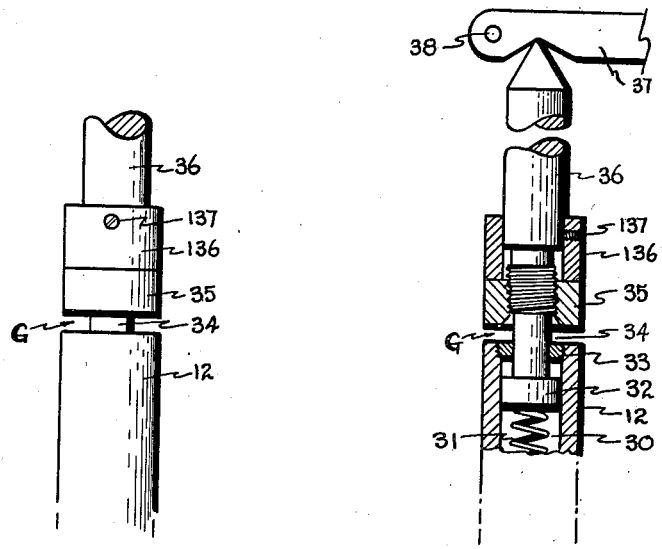

Figs. 2 and 3 show the load device and the upper end of the spindle.

Slidably mounted in the machine frame 10 is a spindle 12 whose lower tip is a penetrating point 20. An element of a gauge 22 engages spindle 12 for measuring.

In a cavity 30 of spindle 12 is a minor load spring 31 supporting a washer 32 disposed under a guide nut 33 for the shank 34 of a major load device including a pad 35 threaded on a link 36 integral with shank 34, the pad being locked in place by a locking collar 136 having a locking screw 137. The upper end of link 36 is engaged by the major load lever 37, fulcrumed at 38 on frame 10.

Parts 34—35—36 comprise the load device. The minor load gap G between such device and spindle 12 may be varied by adjusting the position of nut or pad 35. This determines the minor load gap G, between spindle 12 and pad 35, to be closed for the minor load setting (compression of spring 31) by raising the elevating screw 60, the work between it and point 20, and spindle 12. This gap is visible through hole 39 of the frame, which gives access to parts 35 and 137, manipulable for adjustment.

I claim:

1. An adjusting means for determining the minor load gap of a hardness tester machine of the penetrating type wherein there is a minor load gap between a major load device and a penetrating spindle to be taken up during the setting of the machine and wherein the size of that minor load gap must be accurately adjusted during the life of the machine comprising said penetrating spindle, the spindle being formed with an open top cavity in its upper end, a minor load spring therein, and a major load device having its lower end within the cavity and bearing down upon the upper end of the spring, and means adjustably positioned on the load device above the upper end of the spindle and adapted to form an adjustable bearing for the load device on said spindle upper end, said adjustable bearing means comprising a nut threaded on the load device, and lock means for locking said nut in manually adjusted position on the load device, the gap between the nut and the spindle being visible during the adjustment of the nut on the load device and during the minor load setting, or movement of the spindle, with compression of the spring therein, upwardly towards said nut, and means within the spindle cavity for sealing its open upper end around the major load device.

2. An adjusting means for determining the minor load gap of a hardness tester machine of the penetrating type wherein there is a minor load gap between a major load device and a penetrating spindle to be taken up during the setting of the machine and wherein the size of that minor load gap must be accurately adjusted during the life of the machine comprising said penetrating spindle, the spindle being formed with an open top cavity in its upper end, a minor load spring therein, and a major load device having its lower end within the cavity and bearing down upon the upper end of the spring, and means adjustably positioned on the load device above the upper end of the spindle and adapted to form an adjustable bearing for the load device on said spindle upper end, said adjustable bearing means comprising a nut threaded on the load device, and lock means for locking said nut in manually adjusted position on the load device, the gap between the nut and the spindle being visible during the adjustment of the nut on the load device and during the minor load setting, or movement of the spindle, with compression of the spring therein, upwardly towards said nut, and means within the spindle, for engaging the lower end of the load device for guiding the spindle on said load device in its minor load setting movement upward relative to the load device and in its major load movement with the load device and for sealing its open upper end around the major load device.

3. An adjusting means for determining the minor load gap of a hardness tester machine of the penetrating type wherein there is a minor load gap between a major load device and a penetrating spindle to be taken up during the setting of the machine and wherein the size of that minor load gap must be accurately adjusted during the life of the machine comprising said penetrating spindle, the spindle being formed with an open top cavity in its upper end, a minor load spring therein, and a major load device having its lower end within the cavity and bearing down upon the upper end of the spring, and means adjustably positioned on the load device above the upper end of the spindle and adapted to form an adjustable bearing for the load device on said spindle upper end, said adjustable bearing means comprising a nut threaded on the load device, and lock means for locking said nut in manually adjusted position on the load device, the gap between the nut and the spindle being visible during the adjustment of the nut on the load device and during the minor load setting, or movement of the spindle, with compression of the spring therein, upwardly towards said nut, and means within the spindle, for engaging the lower end of the load device for guiding the spindle on said load device in its minor load setting movement upward relative to the load device and in its major load movement with the load device, and for sealing its open upper end around the major load device, the last mentioned means comprising a ring fixed in the upper end of the spindle and closing it, and surrounding the lower end of the load device.

4. In a hardness tester, a load device, a spindle coaxial therewith and movable coaxially relative thereto and whose upper end is engaged by a part of the load device to receive the load thereof, and whose lower end has a penetrating point, the spindle having its upper end formed with a cavity, the lower end of the load device being slidable within the cavity, a minor load spring within the cavity for receiving a thrust from the load device, an adjusting nut mounted on the load device for movement along the axis of the spindle and load device for varying the minor load gap between the upper end of the spindle and that part of the load device engaging it and thus varying the effective compression on the minor load spring when the gap between the spindle and load device is taken up, and a second adjusting nut disposed in said cavity also movable axially along the axis of the spindle and load device for varying the minor load spring compression.

5. In a hardness tester, a load device, a spindle coaxial therewith and movable coaxially relative thereto and whose upper end is engaged by a part of the load device to receive the load thereof, and whose lower end has a penetrating point, the spindle having its upper end formed with a cavity, the lower end of the load device being slidable within the cavity, a minor load spring within the cavity for receiving a thrust from the load device, an adjusting nut mounted on the load device for movement along the axis of the spindle and load device for varying the minor load gap between the upper end of the spindle and that part of the load device engaging it and thus varying the effective compression on the minor load spring when the gap between the spindle and load device is taken up, and a second adjusting nut disposed in said cavity also movable axially along the axis of the spindle and load device for varying the minor load spring compression, the second nut, within the spindle, surrounding the lower end of the load device for guiding the spindle and the load device in their relative movement.

6. In a hardness tester, a major load device, a spindle coaxial therewith and whose lower end has a penetrating point, the spindle having its upper end formed with a cavity, the lower end of the load device being within the cavity, a minor load spring within the cavity for receiving a thrust from the load device, an adjusting nut threaded on the load device, and movable along the axis of the spindle and load device for engaging the upper end of the spindle and varying the minor load gap between the upper end of the spindle and the nut and thus varying the effective compression on the minor load spring when the gap between the spindle and nut is taken up, and means within the spindle cavity for sealing its open upper end around the major load device and for engaging the lower end of the load device for guiding the spindle and said load device in their relative movement.

C. W. CLARK.